United States Patent
Carnahan, III

(10) Patent No.: US 7,322,145 B2
(45) Date of Patent: Jan. 29, 2008

(54) METHOD AND DEVICE FOR DETECTING FISHING CONDITIONS

(75) Inventor: John M Carnahan, III, Springfield, MO (US)

(73) Assignee: John M. Carnahan, III, Springfield, MO (US), Trustee of the John M. Carnahan III Revocable Living Trust Agreement Dated August 16, 1983, as amended.

( * ) Notice: Subject to any disclaimer, the term of this patent is extended or adjusted under 35 U.S.C. 154(b) by 598 days.

(21) Appl. No.: 10/743,380

(22) Filed: Dec. 23, 2003

(65) Prior Publication Data

US 2005/0132633 A1    Jun. 23, 2005

(51) Int. Cl.
*A01K 69/00* (2006.01)
*A01K 69/02* (2006.01)
*A01K 97/00* (2006.01)

(52) U.S. Cl. ..................... 43/4; 43/4.5; 43/7
(58) Field of Classification Search ............ 43/1, 43/4, 4.5, 7, 10, 11, 12, 14; 210/169, 238
See application file for complete search history.

(56) References Cited

U.S. PATENT DOCUMENTS

| | | | | |
|---|---|---|---|---|
| 197,313 A * | 11/1877 | Bates | ........ | 43/14 |
| 343,479 A * | 6/1886 | McClain | ........ | 43/8 |
| 1,036,574 A * | 8/1912 | Crane | ........ | 43/105 |
| 2,203,827 A * | 6/1940 | Kors | ........ | 43/14 |
| 2,553,980 A * | 5/1951 | Ostrander | ........ | 43/14 |
| 2,669,798 A * | 2/1954 | Hesch | ........ | 43/8 |
| 3,521,392 A * | 7/1970 | Brown | ........ | 43/12 |
| 3,699,700 A * | 10/1972 | Kinsell | ........ | 43/14 |
| 3,803,743 A | 4/1974 | Nalepka | | |
| 4,055,087 A | 10/1977 | Carle | | |
| 4,399,629 A | 8/1983 | Duncan | | |
| 4,745,703 A * | 5/1988 | Walter | ........ | 43/14 |
| 5,605,003 A * | 2/1997 | Krc et al. | ........ | 43/12 |
| 5,615,510 A * | 4/1997 | Anderson | ........ | 43/14 |
| 5,722,196 A * | 3/1998 | Flynn | ........ | 43/14 |
| 2002/0017049 A1* | 2/2002 | Millett et al. | ........ | 43/11 |

FOREIGN PATENT DOCUMENTS

DE    3718287    * 12/1988

OTHER PUBLICATIONS

Cabela's Fly-Fishing catalog, Spring/Summer 2004, p. 72.
Orvis Rod and Tackle, Fly-Fishing 2004 vol. 1, p. 78.

* cited by examiner

*Primary Examiner*—David Parsley
(74) *Attorney, Agent, or Firm*—Clark & Brody

(57) ABSTRACT

A screening device includes a screen and frame, and is useful in permitting fishermen to detect conditions of the water to be fished for optimum bait and lure selection. The screening device allows a fisherman to collect aquatic insects rising through the water to be fished, thus alerting the fisherman as to the food being seen and eaten by the fish, and identify what depth the insects are in the water. With this knowledge, the fisherman can select the proper lure or fly to catch the fish present in the tested waters.

4 Claims, 2 Drawing Sheets

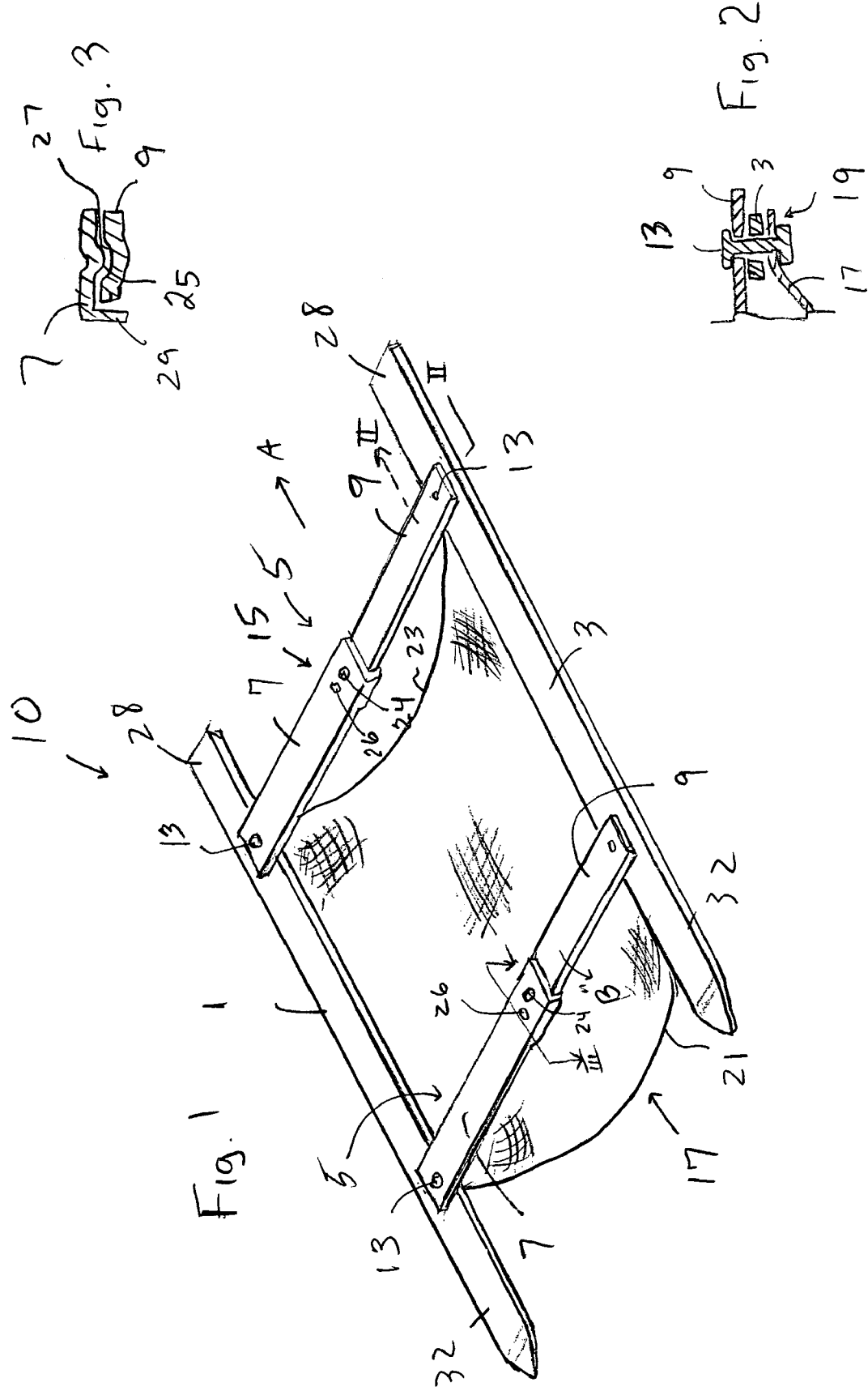

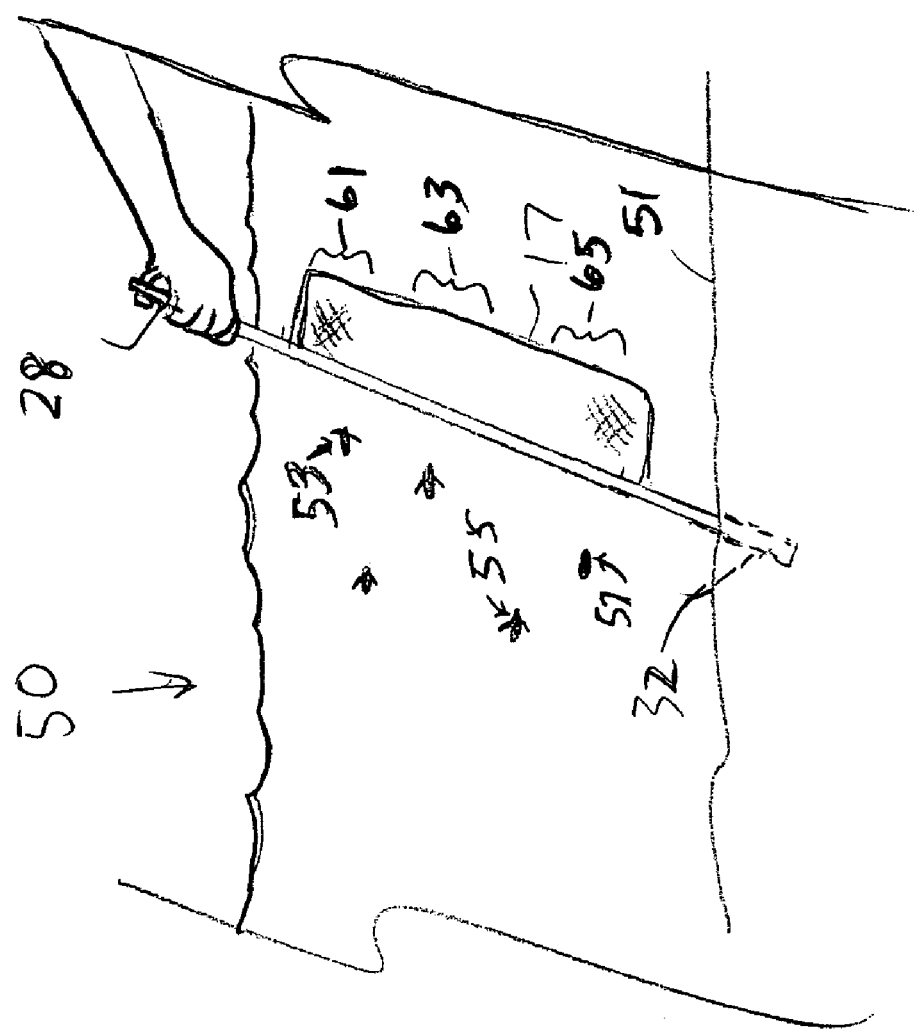

METHOD AND DEVICE FOR DETECTING FISHING CONDITIONS

FIELD OF THE INVENTION

The present invention is directed to a method of detecting fishing conditions, and in particular, to a trout fishing method that allows for the collection of aquatic insects found in water to be fished and selecting a particular type of fish-catching implement or lure matched to the collected insects.

BACKGROUND ART

In the art of fishing, it is known to use screening devices to trap organisms in water for inspection purposes. U.S. Pat. No. 4,055,087 to Carie shows such a device. In Carie, the organisms are generally counted or sampled to monitor aquatic life depletion. U.S. Pat. No. 3,803,743 to Nalepka discloses a screened minnow dipper that facilitates catching and baiting the minnow for fishing. U.S. Pat. No. 4,399,629 to Duncan discloses an apparatus for collecting plankton.

In the art of trout fishing, it is well known that trout are very attracted to aquatic insects regardless of their stage of development. Typically, these stages entail egg, larva, pupa, and adult. The eggs are generally laid in the water, and after hatching, larvae/pupae move about in the water, including rising to the surface and become food for the trout. While the trout will feed on any form, between the pupae and larvae, the pupae is more attractive since it is more noticeable to the fish. In conjunction with these various forms of aquatic insect, the trout fisherman has an assortment of flies, which imitate the aquatic insect form. For example, a nymph fly is used that is an artificial creation of a specific and natural aquatic insect form. Generally, "nymph" is used as a generic description covering larvae, pupae, mayfly nymphs, crustaceans, girdle bugs, etc. The flies can be dressed to float on the surface, i.e., dry flies, or designed to sink below the surface at a certain depth to represent a hatching fly emerging from the depths of the water.

One particular type of aquatic insect is the caddis fly, which is also known as a sedge. The caddis develops through the egg, larvae, pupae and adult stages, and all stages could be imitated using fly patterns to catch trout.

It is also known for fishing that if you know what the fish are currently eating at the time of your fishing trip, you can advantageous select the right kind of bait or lure. In some instances, fishermen pump the stomachs of trout that have been caught to determine what insects or organisms have been eaten by the trout.

If the fisherman has not caught any fish, the stomach pumping technique described above cannot be practiced, and the fisherman is still left without an indication of what the fish are eating during a particular fishing trip. This technique also does not provide information as to what depth the fish may be eating. The patents discussed above provide no advantages to the fisherman in terms of what baits, lures, or the like may be suitable for current fishing conditions.

As such, a need exists for methods and devices that inform the fisherman of current fishing conditions so that the proper fishing lures/bait can be employed.

SUMMARY OF THE INVENTION

It is a first object of the present invention to provide a method of determining fishing conditions and selecting the proper bait, lure, or the like for the detected conditions.

Another object of the present invention is a screening device that allows for easy and efficient collection of organisms by a fisherman standing in a body of water.

Other objects and advantages of the present invention will become apparent as a description thereof proceeds.

In satisfaction of the foregoing objects and advantages, the present invention entails a method of determining of current fishing conditions to aid in lure selection. One aspect of the invention entails a method of detecting fishing conditions to allow for selection of a proper fishing lure by first providing a screening device having an elongated frame. The elongated frame supports an elongate screen, the screen being attached to the frame to form a curved configuration in use. Side rails of the frame can have one or more handle portions displaced from the screen and one or more support portions. The frame can be supported by the one or more handle portions, whereby a user inserts at least a portion of the frame and screen into shallow water. The frame is oriented in the water so the elongate screen spans a depth of the water, preferably extending from near a bottom of the shallow water to near a surface of the shallow water. The screening device is left in the water for a period of time to collect organisms in the water on the screen. The collected organisms are then inspected and based on the inspection, the proper fishing lure can be selected.

The frame can be made collapsible so that is can collapse for storage and travel. One end of the frame can be equipped with pointed tips so that it can be embedded in a bed underlying the water to help secure it in place. The method is especially adapted for fly fishing wherein a fly-type lure is selected based on the organism collected, more preferably larvae/pupae resembling flies. By spanning the depth of the water with the screen, a fly-type lure can be selected based on the where the collected aquatic insects are collected on the screen.

The invention also includes the screening device that comprises a frame having a pair of side rails and at least two cross members. The cross members interconnect a pair of side rails, the side rails including at least one handle portion and one support portion. A flexible screen is provided that has opposing ends and opposing sides. Each opposing side is aligned and attached to a respective side rail, with at least one opposing end being a free end and extending between the pair of side rails. The flexible screen having a width such that the free end is curved in shape during use. Each cross member can be configured to pivot with respect to the side rails to allow the frame to collapse. Each cross member can be formed in segments, with each segment being pivotally attached to a side rail at one end, other ends of each segment being pivotally attached together so that the cross member segments and side rails can fold up.

The cross members and side rails can be immobile with respect to each other when the side rails are interconnected by the cross members. In the folding embodiment, the cross member segments can lock to keep the side rails spaced apart for collecting purposes.

BRIEF DESCRIPTION OF THE DRAWINGS

Reference is now made to the drawings accompanying the invention wherein:

FIG. 1 shows a perspective view of a first embodiment of the invention;

FIG. 2 shows a cross sectional view along the line II-II of FIG. 1;

FIG. 3 shows a cross sectional view along the line III-III of FIG. 1;

FIG. 4 shows a side view of an exemplary use of the screening device of the invention.

DESCRIPTION OF THE PREFERRED EMBODIMENTS

The present invention offers significant improvements in methods of fishing, particularly allowing fishermen to better prepare for fishing. By practicing the invention, fishermen are able to make better choices regarding the type of fishing lure or bait to be used for maximum catching of fish. According to the invention, a fisherman first collects organisms such as aquatic insects in a body of water using a screening device. The screening device can be configured with handles and has a curved screen that permits the fisherman to dip one end of the screen into the body of water for collection purposes. The screen can then be moved through the water, or held stationary if the water is flowing against the screen, so as to collect organisms that may be present in the water. After a period of time wherein water moves through the screen, the screening device is removed from the water and inspected for organisms that are contained in the water. In a preferred mode, one end of the screen penetrates the stream or river bed, with the other end held by the fisherman. Optimally, the screening device is sized to span the depth of the stream being fished so that the collected insects on the screen represent their depth in the water when collected. For example, the fisherman may notice from that collected on the screen that a particular type of hatching fly or other insect is present in the water at a certain depth. Knowing the organism that is prevalent in the waters being fished and/or the proper depth, the fisherman knows what type of lure, fly or bait that would be conducive to catching fish under the current water conditions. If the insects are found closer to the stream or river bottom, a weighted fly would be used as opposed to a dry fly intended to rest on the surface of the water.

FIG. 1 shows a perspective view of one embodiment of the invention, wherein the screening device is designated by the reference numeral 10 and includes a pair of side rails 1 and 3 and cross member arrangements 5. Each arrangement 5 includes a pair of segments 7 and 9. Segments 7 are attached to the rail 1 with segments 9 attached to rail 3.

In the mode shown in FIG. 1, the attachment is the type to allow the device to fold for convenient storage and travel. The segments 7 and 9 could be linked to the rails 1 and 3 using a pivot pin 13, see FIG. 2.

The segments 7 and 9 are linked together using a pivoting and locking arrangement 15. The locking arrangement 15 is similar to that found on a stepladder. Referring to FIGS. 1 and 3, a pivot pin 24 extends through each of the segments 7 and 9. Segment 7 has a protrusion 25, which forms a well 26 in the top surface of the segment 7. A complementary well 27 is formed in the segment 9. When in the position shown in FIG. 1, the protrusion 25 fits in the well 27, locking the segments 7 and 9 against movement. Each of the segments 7 also has a flange 29, which prevents pivoting movement of the segments 7 and 9 in the direction "A". Due to the flange 29, the segments 7 and 9 can pivot and move in one direction only, shown as direction "B" for segment 9. The screening device can be folded merely by applying sufficient force to disengage the protrusion 25 from the well 27 and push the segments in a direction opposite "A". This results in the rails 1 and 3 collapsing together. Of course, other locking mechanisms could be employed in order to extend and maintain the side rails in a spaced apart relationship. For example, one segment could have a set screw that could be rotated to either engage an opening in the other segment or engage a surface to create a binding force against movement.

In yet another embodiment, unitary cross members could be used that pivot with respect to the side rails. The pivots would have a locking mechanism to keep the rails separated, releasing of the locking mechanism allowing the rails to collapse. While this results in a longer collapsed structure than the embodiment of FIG. 1, it is a somewhat simpler structure. The locking mechanism could be any known type, e.g., using fasteners as the pivots that could be tightened to keep the rails separated.

The last component of the device 10 is a screen 17 that is linked to the side rails 1 and 3 and extends between the rails to act as a collecting surface. Referring to FIGS. 1 and 2, the screen 17 has opposing sides 19 and opposing ends 21 and 23. The sides 19 align with the rails 1 and 3 and are attached thereto as shown in FIG. 2. The pivot pin 13 not only interconnects the rail 3 with the segment 9, it also secures the ends 19 of screen 17 to the rail 3. While the pin 13 is shown as a rivet-like pin, any type pin or other fastener could be used to form the pivotal connection between the rails and segments, and secure the screen. The screen 17 is sized in width so that the opposing free ends 21 and 23 are displaced from the cross member arrangements 5. This creates a greater collection surface when inserting the rails 1 and 3 and free end 21 into a body of water that is going to be fished. In this insertion step, one or both of the rail ends 28 could be held by a user of the device while one or both of the opposite and pointed rail ends 32 and screen edge 21 are set into the water. The ends 32 are preferably pointed to facilitate embedding the ends into a streambed, but the ends could take other shapes is so desired. Ideally, the entire screen is placed under the water level to maximize the collection area, even including the ends 28 if so desired by a user. While the rails 1 and 3 are sized to form two handle portions 28 and two support portions 32, the rails could be sized with one handle and one support portion if so desired. In yet another embodiment, the portions 28 and 32 could be eliminated with the user grasping the side rails. It is preferred to size the rails 1 and 3 in a length such that when a user inserts the screening device into water, a user can grasp either handles 28 or cross member arrangement 5 without getting wet.

Referring to FIG. 4, an exemplary use of the screening device 10 is depicted. The screening device is used in a stream 50 of limited depth with the pointed rail ends 32 being driven into a stream bed 51. The screening device is canted to allow the screen 17 to span as much of the stream depth as possible with a user grasping the handles 28 or cross member arrangement 5 to keep the screening device 10 in place. Aquatic insects 53, 55, and 57 are shown in the water at different depths. The screen 17 would collect these insects at different screen areas 61, 63, 65. Identification of the aquatic insects can be made at this stage. Further, identification at particular areas of the screen informs the fisherman as to the depth that the insects are found in the water, thus advising the fisherman where the fish are feeding in the water, and permitting selection of the appropriate baits/lures for fishing.

The frame members of the screening device 10 can be made out of any material, but is preferably made out of corrosion resistant material such as stainless steel, aluminum, fiberglass a composite material containing graphite or the like. The screen 17 can also be made of any conventional screening material, with a preferred material being fiberglass screening which is readily available for windows, doors, and the like.

While the screening device is shown as a folding structure for compactness when traveling or for storage, the rails 1 and cross members could be formed as a rigid structure, with members fixed to each other in a way to prevent relative movement.

The screen mesh size of the screening device should typify the mesh sizes used in standard household screening, e.g., mesh sizes of 14×14 16×16, and 18×18. That is, it is fine enough to catch most of the organisms that would be indicative of current conditions for bait or lure selection, just as it is fine enough to keep insects from entering the interior of a structure.

While the screen 17 is shown curved and open ended in use, the end 23 of the screen opposite the end 21 that initially enters the water could be closed, if desired. For example, the screen 17 could be shaped so that the screen end 23 would rigidly extend between the side rails 1 and 3 when extended, thus leaving only access to the screen via the space adjacent curved end 21 and beneath the rails 1 and 3, and the space between the cross member arrangements 5. With a closed end screen, emptying the screen would require removal of whatever is collected from the open end 21 or through the openings formed by the rails 1, 3, and cross member arrangements 5. An open ended screen is preferred since the inspection process is made easier by merely lifting the screening device from the water, and tipping the device so that the entire screen 17 is visible for inspection. Removal of the insects is also easier with an open-ended screen.

While the screen is shown attached using the pivot pins 13 that interconnect the rails to the cross members, other modes of attachment could be used. For example, the screen could be attached using other fasteners at other points on the rail. In yet another mode, the screen end 19 could loop around the side rail and be attached to itself to form a loop without positive attachment to a rail.

It should be understood that selecting a lure to fish with once the organisms are identified includes both live bait, and artificial lures, such as flies and the like.

The invention is particularly adapted for fishing in shallow bodies of water where fisherman stand, and can easily insert the screening device into the water, retract it, and inspect the screen 17 for collected organisms such as pupae and larvae of aquatic insects. A more preferred use involves trout fishing wherein the lures used for fishing are flies matching the collected insects.

As such, an invention has been disclosed in terms of preferred embodiments thereof, which fulfills each and every one of the objects of the present invention as set forth above and provides a new and improved method of detecting fishing conditions and a device to practice the inventive method.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A screening device for determining fishing conditions comprising:
   a) a frame having a pair of side rails and at least two cross members, the cross members interconnecting the pair of side rails, the side rails include at least one handle portion and one support portion;
   b) a flexible screen having opposing ends and opposing sides, each opposing side aligned and attached to a respective side rail, at least one opposing end being a free end and extending between the pair of side rails, the flexible screen having a width such that the free end is curved in shape during use, wherein each cross member further comprises:
   a pair of cross member segments, each segment pivotally attached to a side rail at one end, other ends of each segment pivotally attached together so that the cross member segments and side rails can fold up.

2. The screening device of claim 1, wherein each end of the screen is free and curved in shape during use.

3. The screening device of claim 1, wherein the cross members and side rails are immobile with respect to each other when the side rails are interconnected by the cross members.

4. The screening device of claim 1, wherein the cross member segments lock to keep the side rails spaced apart for collecting purposes.

* * * * *